United States Patent
Peng

(10) Patent No.: US 11,063,714 B2
(45) Date of Patent: Jul. 13, 2021

(54) METHOD AND DEVICE FOR CONFIGURING FRAME STRUCTURE AND STORAGE MEDIUM THEREOF

(71) Applicant: Beijing Universty of Posts and Telecommunications, Beijing (CN)

(72) Inventor: Mugen Peng, Beijing (CN)

(73) Assignee: Beijing University of Posts and Telecommunications, Beijing (CN)

(*) Notice: Subject to any disclaimer, the term of this patent is extended or adjusted under 35 U.S.C. 154(b) by 112 days.

(21) Appl. No.: 16/215,700

(22) Filed: Dec. 11, 2018

(65) Prior Publication Data

US 2019/0181998 A1     Jun. 13, 2019

(30) Foreign Application Priority Data

Dec. 11, 2017  (CN) .......................... 201711310340.4

(51) Int. Cl.
| | |
|---|---|
| *H04W 72/04* | (2009.01) |
| *H04L 5/00* | (2006.01) |
| *H04W 4/70* | (2018.01) |
| *H04W 28/24* | (2009.01) |
| *H04L 27/26* | (2006.01) |
| *H04L 5/14* | (2006.01) |

(52) U.S. Cl.
CPC .......... *H04L 5/0044* (2013.01); *H04L 5/0007* (2013.01); *H04L 5/0094* (2013.01); *H04L 5/1469* (2013.01); *H04L 27/2602* (2013.01); *H04L 27/2605* (2013.01); *H04W 4/70* (2018.02); *H04W 28/24* (2013.01); *H04W 72/044* (2013.01)

(58) Field of Classification Search
None
See application file for complete search history.

(56) References Cited

U.S. PATENT DOCUMENTS

| 2017/0290013 A1 | 10/2017 | McCoy et al. |
| 2017/0338920 A1 | 11/2017 | Kim et al. |

FOREIGN PATENT DOCUMENTS

| CN | 103249153 A | 8/2013 |
| CN | 106301738 A | 1/2017 |
| CN | 106358297 A | 1/2017 |
| WO | WO-2017032408 A1 | 3/2017 |
| WO | WO-2017035300 A1 | 3/2017 |
| WO | WO-2017194023 A1 | 11/2017 |

OTHER PUBLICATIONS

Chinese Office Action for App. No. 201711310340.4, dated Oct. 31, 2019, and its English translation thereof.

(Continued)

*Primary Examiner* — Willie J Daniel, Jr.
(74) *Attorney, Agent, or Firm* — Harness, Dickey & Pierce, P.L.C.

(57) ABSTRACT

A method for configuring a frame structure executed by an orchestrating device. The method includes obtaining information of requirements of services accessed in a network and current status of the network and generating a frame structure for the services according to the information of the requirements of the services and the current status of the network based on a preconfigured universal frame structure blueprint. Accordingly, a device for configuring a frame structure and a storage medium are also disclosed.

6 Claims, 6 Drawing Sheets

(56) References Cited

OTHER PUBLICATIONS

Pederson, Klaus et al. "A Flexible Frame Structure for 5G Wide Area"; Nokia Networks, Aalborg, Denmark; Department of Electronic Systems, Aalborg University, Denmark.
Pederson, Klaus I. et al., "A Flexible 5G Frame Structure Design for Frequency-Division Duplex Cases"; Radio Communications; IEEE Communications Magazine, pp. 53-59, Mar. 2016.

METHOD AND DEVICE FOR CONFIGURING FRAME STRUCTURE AND STORAGE MEDIUM THEREOF

CROSS-REFERENCE TO RELATED APPLICATIONS

This application claims the benefit and priority of Chinese Patent Application No. 201711310340.4, filed on Dec. 11, 2017. The entire disclosure of the above application is incorporated herein by reference.

FIELD

The present disclosure relates to network technologies and, in particular, to a method and device for configuring a frame structure and a storage medium thereof.

BACKGROUND

This section provides background information related to the present disclosure which is not necessarily prior art.

Networks now need to meet the requirements of diversified services and applications as a result of the creation of the 5G network. In addition to traditional broadband communications and enhanced broadband communications, Internet within machines involving various types of communications, including communication within vehicles and tactile Internet communications, will become an important part of future 5G communications. According to some predictions, the number of machine devices compatible with the 5G network will increase by 10-100 times, creating urgency in the introduction of new, large-scale communication technologies involving machines. Compared with traditional broadband communications, the 5G network has distinct characteristics, including small packets, large amount of connections, and the capability of producing data quickly, which propose challenges to the existing Long Term Evolution (LTE) network in regard to network signaling overhead. The configurations of the Uu interface, including the design of the physical frame structure, needs a corresponding and proper evolution. Further, new services, such as Internet of Vehicles communications and tactile Internet communications, require the network to provide a communication delay of 1 millisecond (ms). The current round trip delay in the LTE is up to 8 ms, which causes difficulty in meeting the requirements of a 5G network, thus presenting an opportunity and challenge for mobile operators to design a physical frame structure adapting to diversified services, which requires different services of the emerging vertical industry in the design and operation of the network.

The existing physical frame structure is fixed, which cannot be adapted to the environments of the services and networks to improve the experience of different devices or to improve the utilization of network resources.

SUMMARY

This section provides a general summary of the disclosure, and is not a comprehensive disclosure of its full scope or all of its features.

The present disclosure provides a method for configuring a frame structure. According to the method disclosed, the frame structure can be configured flexibly combined with the performance requirements of services and network status, thus to satisfy with the requirements of different services in 5G network.

According to various examples of the present disclosure, the method for configuring a frame structure includes the following procedures:

obtaining information of requirements of services accessed in a network and current status of the network; and generating a frame structure for the services according to the information of the requirements of the services and the current status of the network based on a preconfigured universal frame structure blueprint.

The method of frame structure configuration according to the present disclosure considers both the status and performance of the network, and the adaption to devices and services. Thus, a high capacity in hot spots and a seamless coverage in non-hot spots can be achieved. A low delay and a high reliability in parts of the machine-type communications and a mass connection in the massive Internet of products and services can also be achieved. According to the present disclosure, the frame is adjustable to meet different requirements of diverse services in 5G network.

Various embodiments of the present disclosure provide a device for configuring a frame structure, which includes one or more processors; a memory; and a universal frame structure blueprint may be preconfigured in the memory; one or more programs stored in the memory and to be executed by the one or more processors, the one or more programs comprise instructions to obtain information of requirements of services accessed in a network and current status of the network; and generate a frame structure for the services according to the information of the requirements of the services and the current status of the network based on the preconfigured universal frame structure blueprint According to various embodiments of the present disclosure, a non-transitory computer-readable storage medium, comprising a set of instructions for implementing the method for configuring a frame structure is disclosed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
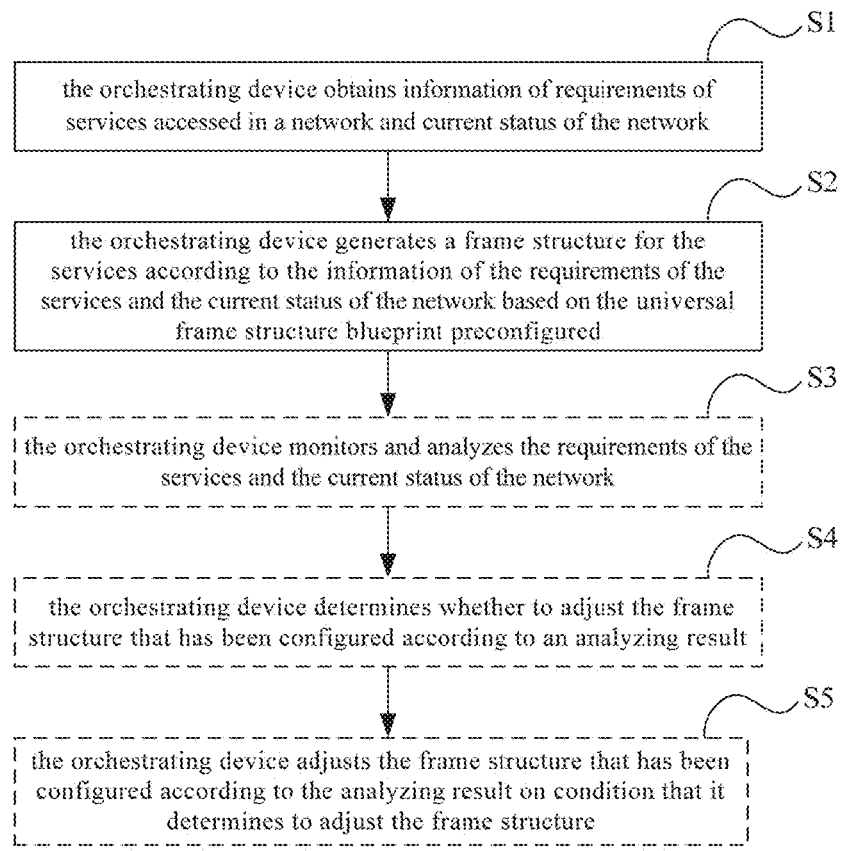
FIG. 1 is a flow chart of the method of frame structure configuration according to various embodiments of the present disclosure.

Example embodiments will now be described more fully with reference to the accompanying drawings.

Examples of the present disclosure are described in detail below, and the examples are illustrated in the drawings, wherein the same or similar reference signs are used to refer to the same or similar elements or elements having the same or similar functions. The examples described below with reference to the drawings are intended to be illustrative of the invention and are not to be construed as limiting.

These and other aspects of the examples of the present disclosure will be clear from the description and appended claims. In the description and drawings, specific examples of the invention are disclosed. However, the invention is to cover all modifications, variations and equivalents within the spirit and scope of the appended claims.

According to various embodiments of the present disclosure, an orchestrating device for configuring a frame structure may be configured and implemented. The orchestrating device may be used to orchestrate frame structures according to requirements of services and status of networks. The requirements of services may include some service level indicators, such as delay, the number of connections, and capacity. These service level indicators may be indicated in a service level agreement. The requirements of services may include capacity of the services, which may be indicated in network resource requests sent from network providing services (such as a network slice). Moreover, the orchestrating device may further be used to analyze information on the creation, modification, and configuration relating to services and networks, to obtain the requirements of the services. The status of networks may refer to the status of an access network, which may include available spectrum bandwidth, the performance of the access network, the load of the access network, etc.

The orchestrating device may include the requirements of services and the status of networks. For example, the requirements on delay, the number of connections, and capacities of the services. The outputs of the orchestrating device may be a frame structure. The frame structure may be defined by a general frame structure and the type of the numerology of the general frame structure. Wherein, the general frame structure defines the length of the frame, the number of sub-frames included in the frame, the length of the sub-frame, the functional time periods included in the frame, the length of different functional time periods, and the spectrum bandwidth used.

In the present disclosure, the general frame structure may be determined based on a preconfigured universal frame structure blueprint in the orchestrating device. The type of the numerology of the general frame structure may be determined by analyzing the requirements of services and the status of the network obtained. According to various embodiments of the present disclosure, the type of the numerology of the general frame structure may be a single type of the numerology or a combination of multiple types of the numerology. Those skilled in the art will understand that, according to 3GPP protocols, the type of the numerology may define service specified parameters of a frame structure, which include the subcarrier space, the length of OFDM symbols, and the length of a CP.

Figure 2:
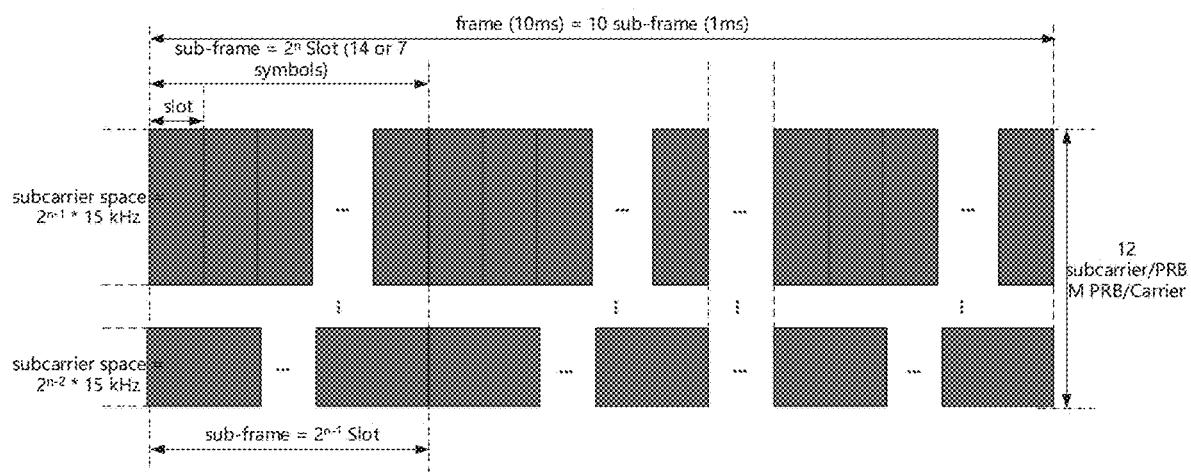
FIG. 2 is an illustration of a general frame structure according to various embodiments of the present disclosure.
Figure 3:
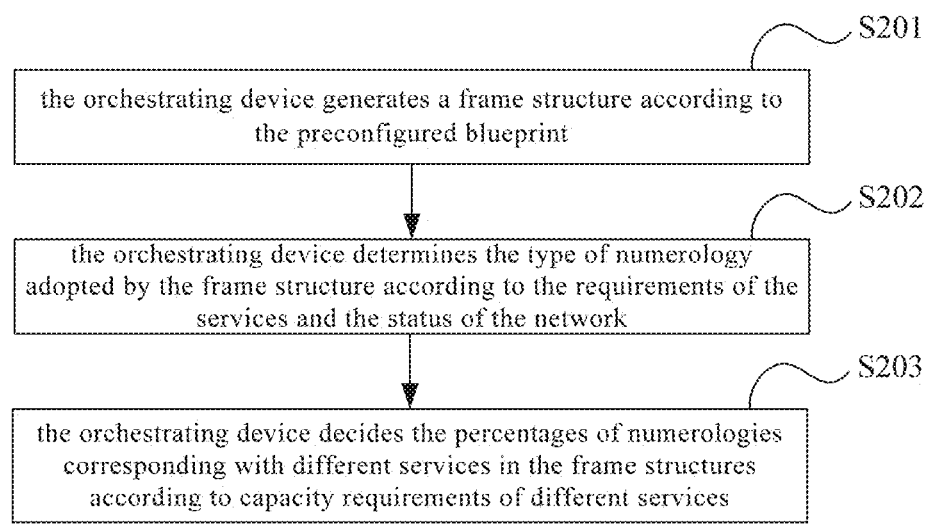
FIG. 3 is a flow chart illustrating an example of how to generate a frame structure for the services according to various embodiments of the present disclosure.

During the orchestration of a frame structure, the orchestrating device interacts with other functional modules in the network to collect the required information. For example, the requirements of the services may be obtained through the service level agreement received from the core network, and also through the information of network resource requests from the network providing services (e.g., network slice). By analyzing the information on the creation, modification, and configuration relating to the services and networks, the orchestrating device may obtain the requirements of the services, which include delays, the number of connections, and capacities. The orchestrating device then orchestrates the frame structures, according to the requirements of the services and the status of network. The frame structure output by the orchestrating device may include a general frame structure with specific services and specific parameters, such as the subcarrier space, the length of an OFDM symbol, the length of a CP, the length of different functional time periods, the spectrum bandwidth used, and so on. The frame structure configured may be a universal frame structure, and the universal frame structure configuration can ensure the adaption with services and devices. In the time domain, the units adopted in the frame include OFDM symbols, slots, sub-frames, and the frames. As shown in FIG. 2, the so-called frame (10 ms) consists of multiple sub-frames with same length (1 ms). The sub-frame consists of multiple slots with the same length. The slot consists of multiple OFDM symbols with the same length. The length of an OFDM symbol is flexible and is determined by the requirements of the performance of the service. There is a fixed mapping relationship between an OFDM symbol in the time domain and the subcarrier space in the frequency domain. The length of a CP needs to be greater than the channel delay expansion, which includes a range in the time domain that is determined by the cell coverage, spectrum efficiency, and wireless communication frequency range.

The length of the frame is $T_{frame}=N_{subframe}*T_{subframe}$, where $T_{frame}$ is the length of the frame (10 ms), $N_{subframe}$ is the number of the sub-frames (10 sub-frames), and $T_{subframe}$ is the length of the sub-frame (1 ms). The length of the sub frame is $T_{subframe}=N_{slot}*T_{slot}$, where $T_{subframe}$ is the length of the sub-frame (1 ms), $N_{slot}$ is the number of the slots, and $T_{slot}$ is the length of the slot, which is determined by the requirements of the performance of the service. There is a fixed mapping relationship between the OFDM symbol in the time domain and the subcarrier space in the frequency domain. For example, if the length of the slot is $T_{slot}=\frac{1}{2}^n$ ms, there are $N_{slot}=2^n$ slots in a sub-frame, and the subcarrier spaces $15*2^{n-1}$ kHz, where n is an integer. The more stringent the service demands on the delay performance, the greater the value of n. In the example of an LTE system, the length of the slot is 0.5 ms n=1, there are 2 slots in a sub-frame, and the subcarrier space is 15 kHz.

Based on the foregoing orchestrating device, various embodiments of the present disclosure provide a method for configuring a frame structure which may be executed by the orchestrating device described above. According to various embodiments of the present disclosure, a universal frame structure blueprint may be preconfigured in the orchestrating device. The universal frame structure blueprint defines a general frame structure, which acts as a base for orchestrating a frame structure. In the general, preconfigured frame structure, a plurality of sub-frames with the same length may be included. Further a plurality of slots with the same length may be included in a sub-frame of the general frame structure. A slot may include four types of functional time periods, including a downlink control time period, a data time period, a GP, and an uplink control time period. Based on the preconfigured universal frame structure blueprint, the orchestrating device may orchestrate a frame structure according to the requirements of the services and the status of the networks.

FIG. 1 illustrates a flow chart of the method for configuring a frame structure executed by the orchestrating device according to various embodiments. The method includes the following.

Block S1: The orchestrating device obtains information on the requirements of services accessed in a network and the current status of the network. According to various embodiments of the present disclosure, the requirements of the services accessed in the network may be obtained by interacting with other functional modules in the network. The requirements of the services may be indicated in a service level agreement from a core network, or in the information of resource requests from the network providing services (e.g., network slice). In the service level agreement, service requirements on the delay, the reliability, the number of connections and transmission rate are indicated. Based on resource requests, the service packet size to be transmitted and the capacity requirements of different services are implied.

The current status of the network may include available resources in the access network, the load of the access network, and the current performance status of the access network. The available resources in the network indicate the resource block, spectrum bandwidth, and so on. This information is predefined during the initial network configuration procedure. Thus, it is recognized by all base stations in the network. The current performance status includes performance indicators, such as the provided transmission delay and rate, the number of devices accessing the network, and the current mobility and location of the users. This information may be periodically reported by the devices accessed in the network. The load of the access network may be obtained from the access requirements from the users.

Block S2: The orchestrating device generates a frame structure for the services according to the information of the requirements of the services and the current status of the network based on the preconfigured universal frame structure blueprint. The generated frame structure may be utilized by the base stations in the physical layer, which serve the users and the devices requesting the services.

The universal frame structure blueprint defines the general frame structure that can be used. In particular, in the preconfigured general frame structure, a plurality of sub-frames with the same length are included. A plurality of slots with the same length are included in a sub-frame. A slot may include four kinds of functional time periods, including a downlink control time period, a data time period, a GP, and an uplink control time period. The configured frame structure can be called a universal frame structure.

According to various embodiments of the present disclosure, block S2 can be divided into the following processes.

Figure 4:
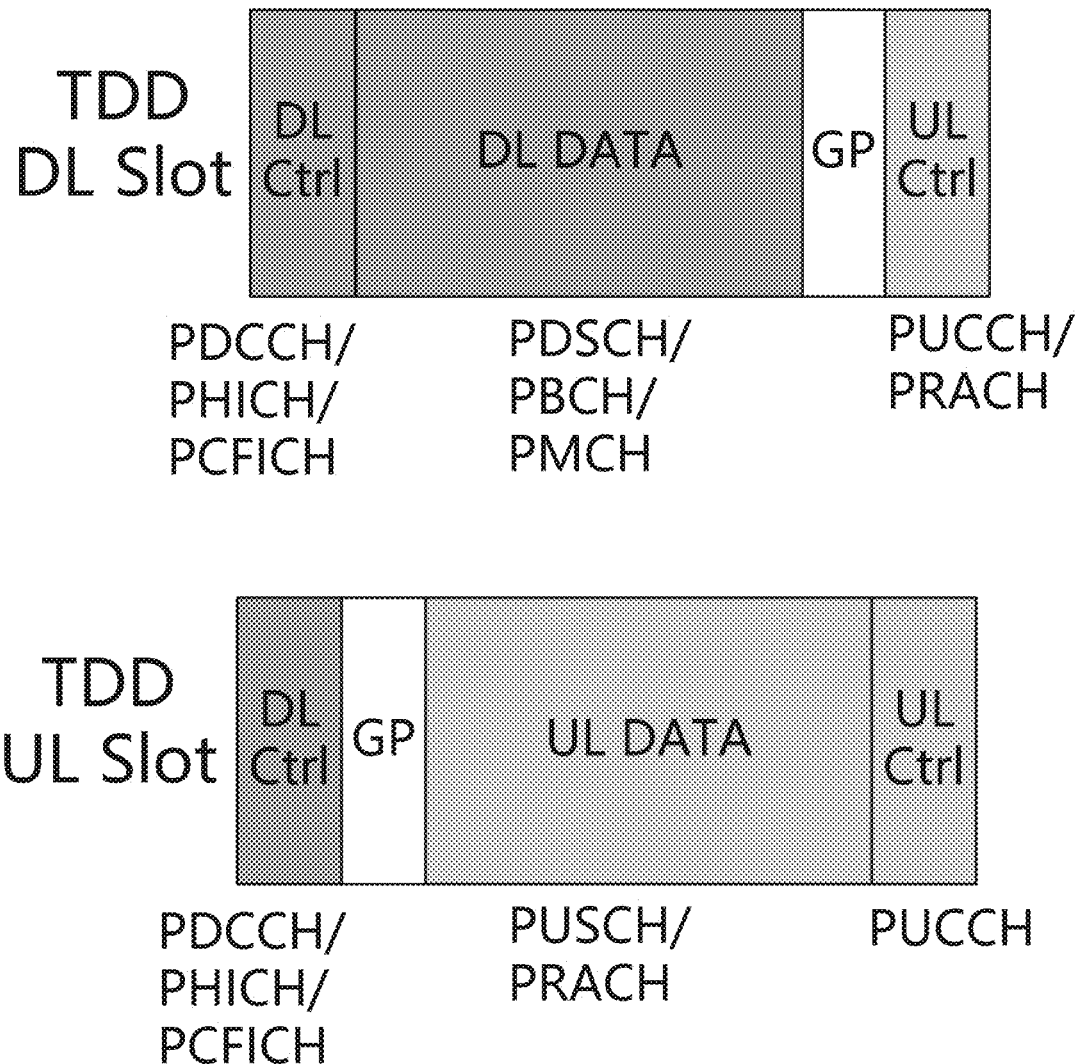
FIG. 4 is an illustration of a slot in the general frame structure according to various embodiments of the present disclosure.

S201: The orchestrating device generates a frame structure according to the preconfigured blueprint. In the frame structure, the length of the frame may be 10 ms. There may be 10 sub-frames in the frame, and the length of each sub-frame may be 1 ms. The sub-frame includes identified slots. In a slot, the functional time periods may include the downlink control time period, the data time period, the GP, and the uplink control time period. An example of the slot is shown in FIG. 4. The downlink control time period is utilized by scheduling entities, such as base stations, to transmit downlink control signaling and Common Reference Signal (CRS) to the device equipment. The related channels include the Physical Control Format Indicator Channel (PCFICH), the Physical Downlink Control Channel (PDCCH), and the Physical Hybrid-ARQ Indicator Control Channel (PHICH). The data time period is utilized to transmit the service data of one or multiple devices, which can be divided into two categories, including the uplink data time period and the downlink data time period. The downlink data time period is utilized to transmit the service data corresponding with the downlink control signaling, i.e., the service data transmitted by scheduling entities to one or multiple targeted device equipment. The related channels include the Physical Downlink Shared Channel (PDSCH), the Physical Broadcast Channel (PBCH), and the Physical Multicast Channel (PMCH). The uplink data time period is utilized to transmit the uplink service data, and the related channel is the Physical Uplink Shared Channel (PUSCH). Moreover, the data time period can also be used to transmit part of the signaling according to the service scenario. The GP provides transition time for the stability of transceiver conversion and prevents mutual interference between uplink and downlink. The uplink control time period is utilized to transmit the uplink control signaling and signals such as ACK/NACK, scheduling request (SR), sounding reference signals (SRS), channel state feedback, cache state, and so on. The related channels include the Physical Uplink Control Channel (PUCCH) and the Physical Random Access Channel (PRACH).

In downlink data transmission, the PDCCH indicates the time-frequency resource that is used for the service data transmission of each device during the downlink control time period. During the downlink data time period, the service data of each device is transmitted. The resources allocated to each device are orthogonal in the time domain and in the frequency domain. Each device obtains and decodes its downlink data according to the scheduling information obtained during the downlink control time period, and replies the ACK/NACK during uplink control time period. In uplink data transmission, if there is no time-frequency resource reserved for the device in the PUCCH to send the SR signal during the uplink control time period, the device needs to initiate a random access process through PRACH to complete the request for SR time-frequency resources, otherwise, the device may send the SR signal directly. After demodulation and decoding, the scheduling entity sends grant signaling to the device through the PDCCH of the next time slot to indicate the time-frequency resource carrying the device's uplink service data, and the device sends the data that needs to be uploaded during the uplink data period. S202: The orchestrating device determines the type of numerology adopted by the frame structure according to the requirements of the services and the status of the network.

The orchestrating device may determine the type of numerology, or a hybrid of a plurality of types of numerologies, adopted by a service and/or a device through the report information and analysis results of the requirements of the services on the delay, the reliability, the transmission rate, the packet size, the number of devices accessing the network, and the current location of the users and devices. Different numerologies are non-overlapping in the frequency domain and in the time domain.

According to various embodiments of the present disclosure, there are three defined types of numerologies, which correspond with three main types of services with different service requirements. The detailed configurations of the three defined types of numerologies are different.

For the Enhance Mobile Broadband (eMBB) service, the orchestrating device adopts the frame structure of the TD-LTE to determine the configuration of the eMBB service.

Figure 5:
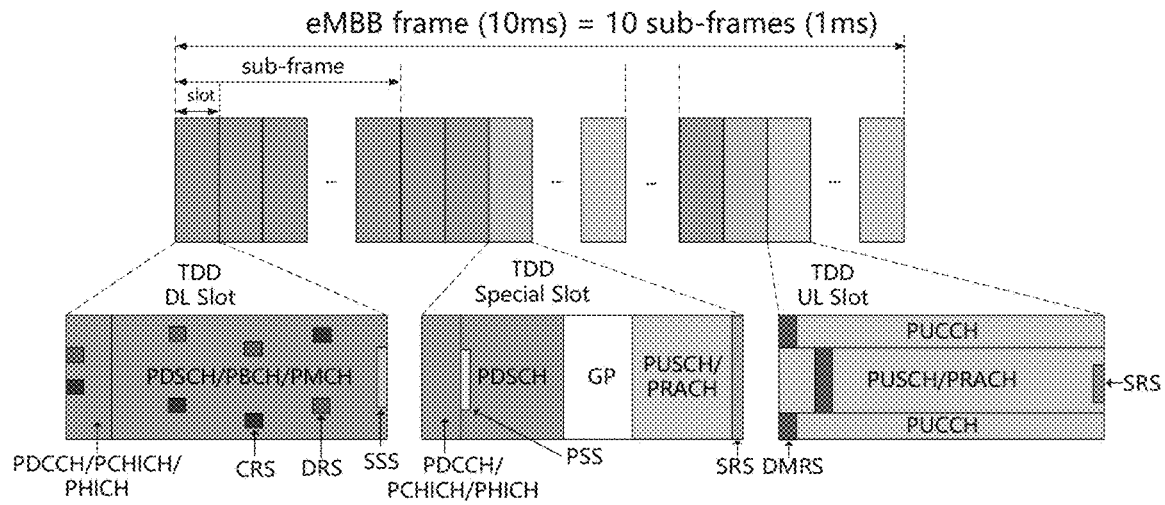
FIG. 5 is an illustration of an eMBB frame, which is based on the presented general frame structure and slot.

The eMBB service processes traditional mobile broadband related services, which provide users with a higher data transmission rate and a better seamless connection experience. In the configuration of the frame structure, the compatibility with the existing frame structure is considered. As shown in FIG. 5, three different slots exist in the eMBB frame structure, including a TDD DL slot, a TDD UL slot, and a special slot. The TDD DL slot transmits the downlink data, the TDD UL slot transmits the uplink data, and the special slot occurs when downlink is converted to uplink to protect the downlink signal from the upturn signal. In the TDD DL slot, there are 14 OFDM symbols, including 1~3 OFDM symbols, which are allocated to downlink control time period for PDCCH,PCFICH and PHICH, and the residual symbols are allocated to downlink data time period for PDSCH. There is no symbol assigned to the GP or uplink control time period. In the TDD UL slot, there is no symbol assigned to the downlink/uplink control time period or GP. All the 14 OFDM symbols are assigned to the uplink data time period, and the uplink data time period is divided into multiple orthogonal parts for PUCCH, PUSCH, and PRACH, respectively. In the special slot, there are 14 OFDM symbols, including 1~2 OFDM symbols, which are allocated to downlink control time period, 1~10 OFDM symbols, which are allocated to downlink data time period, 1~10 OFDM symbols, which are allocated to GP, and 1~2 OFDM symbols, which are allocated to uplink control time period. When the length of the slot is 0.5 ms and the subcarrier space is 15 kHz, the above eMBB frame is the same as the existing TD-LTE frame. Moreover, to meet the demand for higher rates, more bandwidth and more subcarriers are allocated to carry more data and the length of CP is adjusted based on the coverage.

For the Massive Machine Type Communication (mMTC) service, the orchestrating device adopts the numerology compatible with the LTE, or numerology with a shorter subcarrier space and a longer slot to determine the configuration of the mMTC service. Wherein, the extended slot includes a longer OFDM symbol and a longer CP.

The mMTC service addresses application scenarios targeting data sensor and acquisition, such as intelligent city, environment monitoring, intelligent agriculture, and forest fire prevention. The mMTC service needs to meet the connection density of 1 million/square kilometers, while ensuring ultra-low power consumption and ultra-low cost of the devices. The small data volume characteristics and the tolerability of delay in mMTC services, not only the numerology compatible with the LTE (0.5 ms slot length and 15 kHz subcarrier space), but also the numerology with a shorter subcarrier space and a longer slot (2 ms slot length and 3.75 kHz subcarrier space) can be adopted. An extended slot, including a longer OFDM symbol and a longer CP, can provide better multipath protection. The Primary synchronization channel (PSCH) and Secondary synchronization channel (SSCH) with longer cycle times can reduce the overhead.

Figure 6:
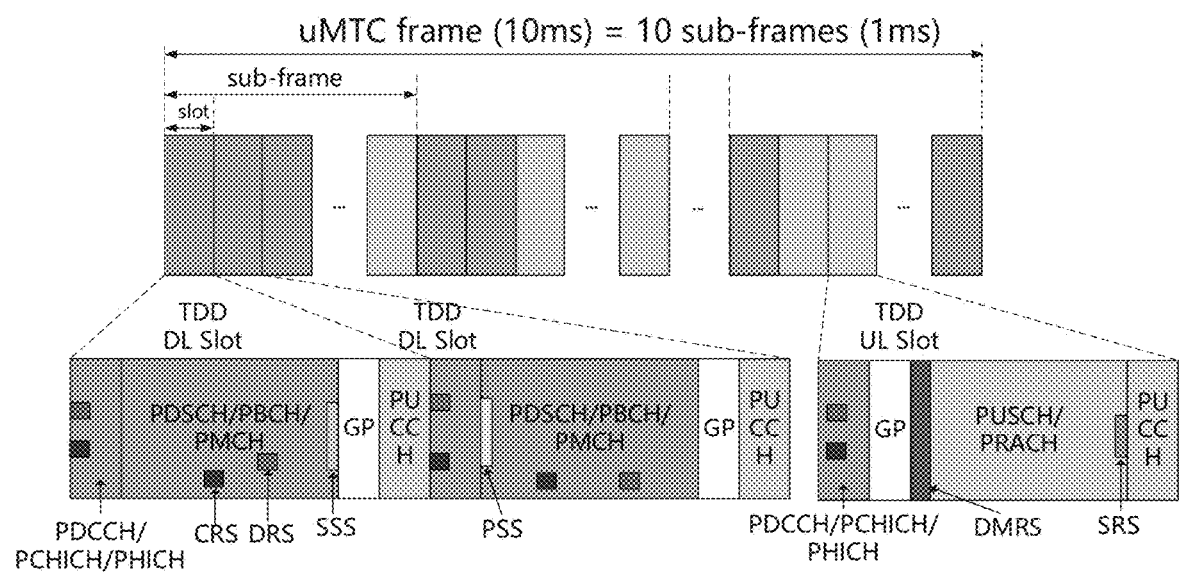
FIG. 6 is an illustration of a uMTC frame, which is based on the presented general frame structure and slot, according to various embodiments of the present disclosure.

The mMTC frame is shown in FIG. 6. Due to the limitation of the system bandwidth, separate broadcast, control, or service transmissions need to occupy the entire bandwidth of one physical resource block. In the case that the TDD DL slot transmits the downlink control signaling, 1~12 OFDM symbols are allocated to the downlink control time period, which transfers information related to user scheduling and paging through PDCCH. There is no symbol assigned to the downlink data time period. In the case that the TDD DL slot transmits the system downlink broadcast information or downlink service data of users, there is no symbol assigned to the downlink control time period. 1~12 OFDM symbols are allocated to downlink data time period, which transfers information through PBCH or PDSCH. Since there is no multimedia broadcast/multicast service in the mMTC service, the downlink control time period is only used for PDCCH, the downlink data time period is only used for PBCH or PDSCH, and there is no PMCH in the TDD DL slot. According to the service coverage and switching performance between the uplink and downlink, 1~10 OFDM symbols are allocated to the GP and 1~2 OFDM symbols are allocated to uplink control time period, which are used for the signaling transmission related to the control and access, such as the HARQ-ACK/NACK in the PDSCH. In the TDD UL slot, 1~3 OFDM symbols are allocated to downlink control time period for PBCH, PDSCH, or PDCCH, such as the grant signaling to the device, which indicates the time-frequency resource in the PUSCH for service data transmission. Similarly, 1~10 OFDM symbols are allocated to the GP and 1~11 OFDM symbols are allocated to uplink data time period for PUSCH and PRACH, which are used for the data transmission and access related signaling. 1~2 OFDM symbols are allocated to uplink control time period to transmit control signaling. The reference signals in the TDD DL slot and TDD UL slot include DRS, CRS, and DMRS. DRS is used for user demodulation, CRS is used for downlink channel estimation, and DMRS is used for the demodulation of the uplink control/data related channels.

For the ultra-low-latency MTC (uMTC) service, the orchestrating device adopts the numerology with preset slots and symbols in the time domain, and a preset subcarrier space in the frequency domain to determine the configuration of the uMTC service.

Figure 7:
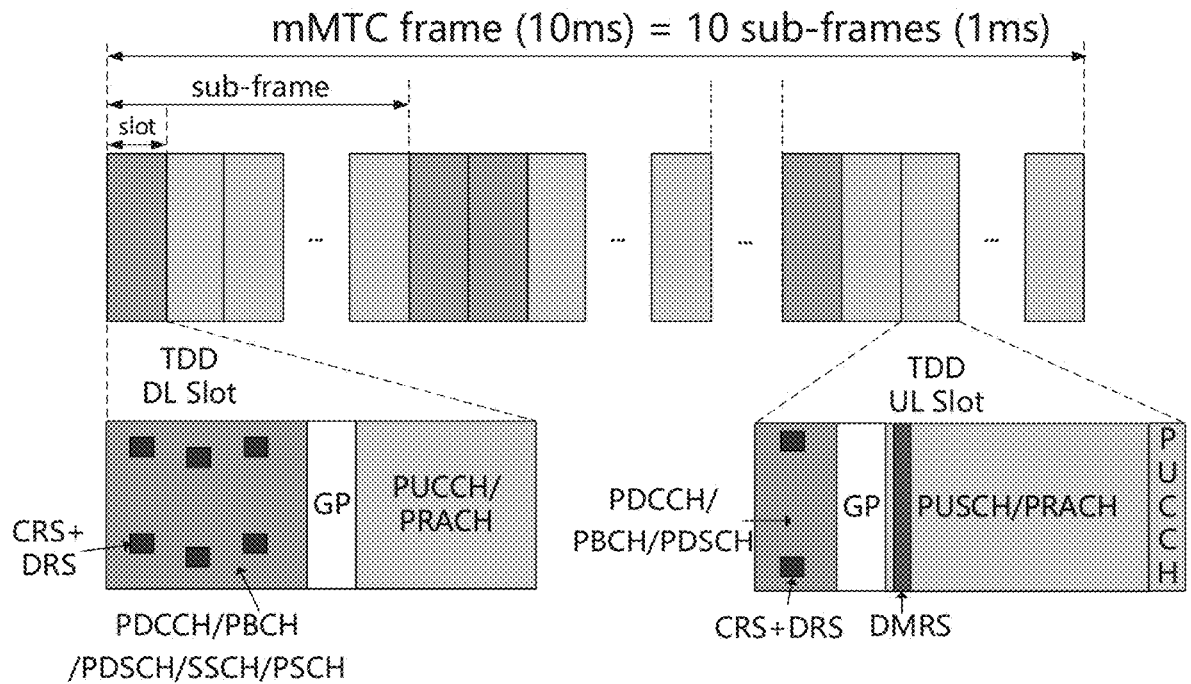
FIG. 7 is an illustration of an mMTC frame, which is based on the presented general frame structure and slot, according to various embodiments of the present disclosure.

The uMTC service addresses special applications in the vertical industries, such as the Internet of Vehicles and an Industrial Control scenario. These applications have extremely high requirements for latency (1 ms) and reliability (almost 100%). To achieve a shorter slot (e.g., 125 us) and symbol length (e.g., 8.33 us), the subcarrier space needs to be extended (e.g., 60 kHz). Thus, there are 8 slots in one sub-frame. As shown in FIG. 7, in the TDD DL slot of the uMTC frame structure, there are 14 OFDM symbols, including the first 2 OFDM symbols, which are allocated to the downlink control time period, the next 7 OFDM symbols, which are allocated to the downlink data time period, the next 3 OFDM symbols, which are allocated to the GP, and the residual 2 OFDM symbols, which are allocated to the uplink control time period. The CP length is 0.5 us, which can provide multipath protection capability within the extended range of 135 m in the urban area and 485 m in the suburbs. The downlink control time period is used for PDCCH, PCFICH, and PHICH. Through the PDCCH, the scheduling entity transmits the scheduling information of the PDSCH, so that the user knows the time-frequency resources carrying the service data. Through the PHICH, the HARQ-ACK/NACK information is transmitted, which indicates whether the service data in the PUSCH is successfully received. Through the PCFICH, the number of OFDM symbols occupied by the control period (as a time domain length) in the current time slot are indicated. The uplink control time period is used for PUCCH. Through PUCCH, the HARQ-ACK/NACK information is transmitted, which indicates to the scheduling entity whether the service data in the PDSCH is successfully received by the users. The aforementioned configuration ensures that, in a single TDD DL slot, the downlink control time period includes scheduling information, the downlink data time period includes service data associated with the scheduling information, and the uplink control time period includes HARQ-ACK/NACK information to indicate whether the downlink service data is correctly received. Thus, a complete data transmission can be done in a slot to achieve the performance requirement on air interface latency (i.e., less than 1 ms). In the TDD UL slot, the downlink control time period is used for the scheduling of PUSCH and transmission of multi-user power control indication through the PDCCH. The uplink control time period transmits user scheduling requests to the scheduling entity through PUCCH. The reference signals in the TDD DL slot and TDD UL slot include DRS, CRS, DMRS, and SRS. SRS estimates uplink channel, complete frequency selective scheduling, and provide channel estimation information for downlink beam-forming.

S203: The orchestrating device determines the percentages of numerologies corresponding with different services in the frame structures according to the capacity requirements of different services. According to the capacity requirement of different services, the orchestrating device determines the percentages of different types of numerologies corresponding with different services in the frame structure, which ensures that the key performance indicator of the service exceeds a predefined threshold. The so-called percentage of a type of numerology in the frame structure may refer to the allocated frequency band and allocated RB to the service. After determining the types and percentages of numerologies, the orchestrating device may output the frame structure adopted in the network.

According to various embodiments of the present disclosure, to adapt to the requirements of the services and the status of the network dynamically, the method may further include the following.

Block S3: The orchestrating device monitors and analyzes the requirements of the services and the current status of the network. According to various embodiments of the present disclosure, the orchestrating device may monitor and analyze the current status of the network periodically.

Figure 8:
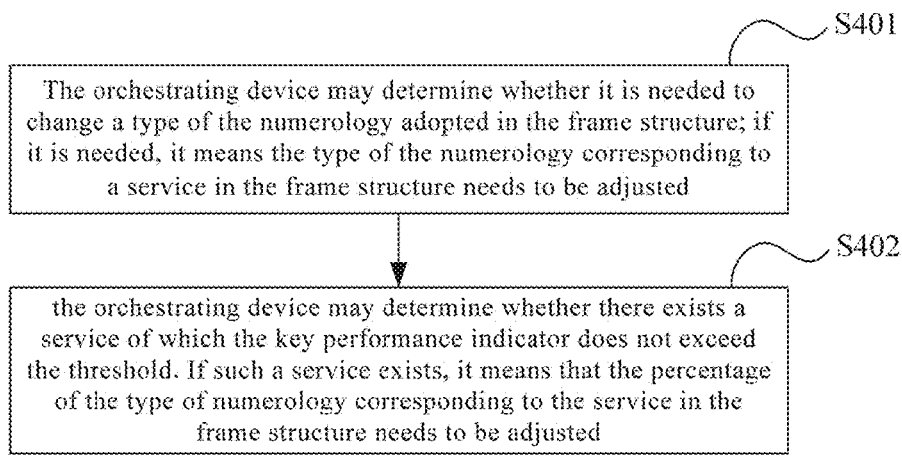
FIG. 8 is a flow chart illustrating an example of how to determine whether to adjust the frame structure that has been configured, according to various embodiments of the present disclosure.

Block S4: The orchestrating device determines whether to adjust the frame structure that has been configured according to an analyzing result. As shown in FIG. 8, block S4 can be divided into the following processes.

S401: According to the analyzing result, the orchestrating device may determine whether it is required to change a type of the numerology adopted in the frame structure. If it is required, the type of the numerology corresponding to a service in the frame structure needs to be adjusted.

S402: According to the analyzing result, the orchestrating device may determine whether there exists a service of which the key performance indicator does not exceed the threshold. If such a service exists, the percentage of the type of numerology corresponding to the service in the frame structure needs to be adjusted.

Figure 9:
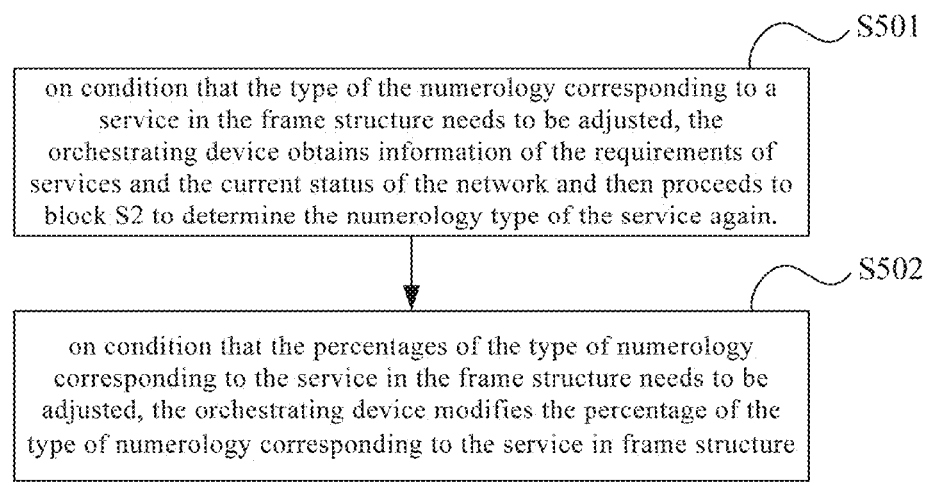
FIG. 9 is a flow chart illustrating an example of how to adjust the frame structure according to various embodiments of the present disclosure.

Block S5: The orchestrating device adjusts the frame structure that has been configured according to the analyzing result on the condition that it determines to adjust the frame structure. As shown in FIG. 9, block S5 can be divided into the following processes.

S501: On the condition that the type of the numerology corresponding to a service in the frame structure needs to be adjusted, the orchestrating device obtains information of the requirements of services and the current status of the network and then proceeds to block S2 to determine the numerology type of the service again.

S502: On the condition that the percentages of the type of numerology corresponding to the service in the frame structure needs to be adjusted, the orchestrating device modifies the percentage of the type of numerology corresponding to the service in frame structure.

According to various embodiments of the present disclosure, block S3 may be repeated to implement adjustment of the frame structure dynamically.

It can be seen from the method for configuring a frame structure described above that both the status of the network and the requirements of the service are taken into consideration, and the frame structure configured can adapt to diversified devices and services. The frame is adjustable to meet the different requirements of diverse services in a 5G network. Thus, a high capacity in hot spots and a seamless coverage in non-hot spots can be achieved. Further, a low delay and a high reliability in parts of the machine type communications and a mass connection in the massive Internet of products and services can also be achieved.

Figure 10:
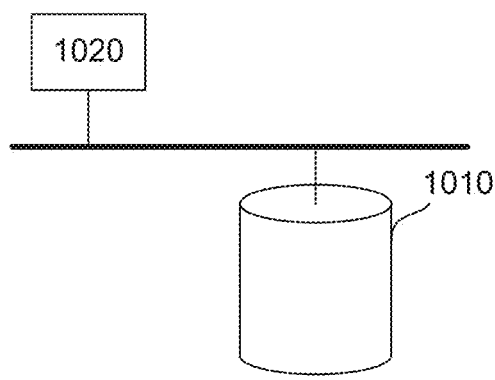
FIG. 10 is a diagram illustrating the structure of the device for configuring a frame structure according to various embodiments of the present disclosure.

According to various embodiments of the present disclosure, a device for configuring a frame structure is also proposed. FIG. 10 illustrates the structure of the device. As shown in FIG. 10, the device may include one or more processors 1020; a memory 1010; and a universal frame structure blueprint may be preconfigured in the memory; one or more programs stored in the memory 1010 and to be executed by the one or more processors 1020, the one or more programs comprise instructions to obtain information of requirements of services accessed in a network and current status of the network; and generate a frame structure for the services according to the information of the requirements of the services and the current status of the network based on the preconfigured universal frame structure blueprint.

The device may generate the frame structures according to the method disclosed in blocks 201 to 203.

According to various embodiments of the present disclosure, the one or more programs may further include instructions to monitor and analyze the requirements of the services and the current status of the network; determine whether to adjust the frame structure that has been configured according to an analyzing result; and adjust the frame structure that has been configured according to the analyzing result on the condition that it determines to adjust the frame structure.

The device may determine whether to adjust the frame structure according to the method disclosed in processes 401 to 402. The device may adjust the frame structure according to the method disclosed in processes 501 to 502.

According to various embodiments of the present disclosure, a non-transitory computer-readable storage medium comprising a set of instructions for configuring a frame structure is also proposed, wherein the set of instructions directs at least one processor to perform acts of obtaining information on the requirements of services accessed in a network and a current status of the network; and generating a frame structure for the services according to the information of the requirements of the services and the current status of the network based on the preconfigured universal frame structure blueprint.

According to various embodiments of the present disclosure, the set of instructions further direct at least one processor to perform acts of monitoring and analyzing the requirements of the services and the current status of the network; determining whether to adjust the frame structure that has been configured according to an analyzing result; and adjusting the frame structure that has been configured according to the analyzing result on the condition that it determines to adjust the frame structure.

Those with ordinary skill in the art will understand that all or a part of the processes in the method according to the embodiments may be implemented by a computer program instructing relevant hardware. The program may be stored in a computer readable storage medium. When the program runs, the processes of the method according to the embodiments are performed. The storage medium may be a magnetic disk, an optical disc, a read-only memory (ROM) or a random access memory (RAM).

The foregoing examples describe several implementation manners of the present disclosure, and their description is detailed, but cannot therefore be understood as a limitation to the patent scope of the present disclosure. It should be noted that a person of ordinary skill in the art may further make variations and improvements without departing from the concept of the present disclosure, and these all fall within the protection scope of the present disclosure. Therefore, the patent protection scope of the present disclosure should be subject to the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A method for configuring a frame structure, executed by an orchestrating device which includes one or more processors and a memory, comprising:
    analyzing information on creation, modification and configuration relating to services and networks, and obtaining information of requirements of services accessed in a network;
    obtaining current status of the network, wherein the current status of the network comprises available resources in an access network, load of the access network and current performance status of the access network, and the current performance status of the access network is periodically reported by devices accessed in the network;
    outputting a general frame structure and a type of a numerology of the general frame structure adopted by a service and a device, wherein the type of the numerology defines service specified parameters of the general frame structure, and the type of the numerology is determined through report information and analysis results of the requirements of the services on delay, reliability, a transmission rate, and a packet size, a number of devices accessing the network and current locations of the devices accessed in the network;
    determining configurations of types of numerologies adopted by the general frame structure according to the requirements of the services and the current status of the network; and
    deciding percentages of allocated frequency bands and allocated resource blocks for numerologies corresponding with different services in the general frame structure according to capacity requirements of different services.

2. The method according to the claim 1, wherein a numerology of Time Division TD-LTE is adopted for an Enhanced Mobile Broadband eMBB service.

3. The method according to the claim 1, wherein a numerology with a preset slot and a preset length of a symbol in a time domain, and with a preset subcarrier spacing in a frequency domain is adopted, for an ultra-low-latency MTC uMTC service.

4. The method according to the claim 1, further comprising:
    monitoring and analyzing the requirements of the services and the current status of the network;
    determining whether it is needed to change a numerology adopted in the general frame structure according to an analyzing result; and if it is needed, adjusting the numerology corresponding to a service in the general frame structure; and
    determining whether there exists a service of which a key performance indicator does not exceed a threshold according to the analyzing result; and if such a service exists, adjusting a percentage of the numerology corresponding to the service in the general frame structure.

5. A device for configuring a frame structure, comprising:
    one or more processors;
    a memory; and
    one or more programs stored in the memory and to be executed by the one or more processors, the one or more programs comprise instructions to:
    analyze information on creation, modification and configuration relating to services and networks, and obtain information of requirements of services accessed in a network;
    obtain current status of the network, wherein the current status of the network comprises available resources in an access network, load of the access network and current performance status of the access network, and the current performance status of the access network is periodically reported by devices accessed in the network;
    output a general frame structure and a type of a numerology of the general frame structure adopted by a service and a device, wherein the type of the numerology defines service specified parameters of the general frame structure, and the type of the numerology is determined through report information and analysis results of the requirements of the services on delay, reliability, a transmission rate, and a packet size, a number of devices accessing the network and current locations of the devices accessed in the network;
    determine configurations of types of numerologies adopted by the general frame structure according to the requirements of the services and the current status of the network; and
    decide percentages of allocated frequency bands and allocated resource blocks for numerologies corresponding with different services in the general frame structure according to capacity requirements of different services.

6. A non-transitory computer-readable storage medium, comprising a set of instructions for configuring a frame structure, the set of instructions to direct at least one processor to perform acts of:
    analyzing information on creation, modification and configuration relating to services and networks, and obtaining information of requirements of services accessed in a network;
    obtaining current status of the network, wherein the current status of the network comprises available resources in an access network, load of the access network and current performance status of the access network, and the current performance status of the access network is periodically reported by devices accessed in the network;

outputting a general frame structure and a type of a numerology of the general frame structure adopted by a service and a device, wherein the type of the numerology defines service specified parameters of the general frame structure, and the type of the numerology is determined through report information and analysis results of the requirements of the services on delay, reliability, a transmission rate, and a packet size, a number of devices accessing the network and current locations of the devices accessed in the network;

determining configurations of types of numerologies adopted by the general frame structure according to the requirements of the services and the current status of the network; and deciding percentages of allocated frequency bands and allocated resource blocks for numerologies corresponding with different services in the general frame structure according to capacity requirements of different services.

\* \* \* \* \*